Nov. 16, 1943.  W. S. MASON  2,334,273
PISTON RING
Filed Oct. 9, 1942
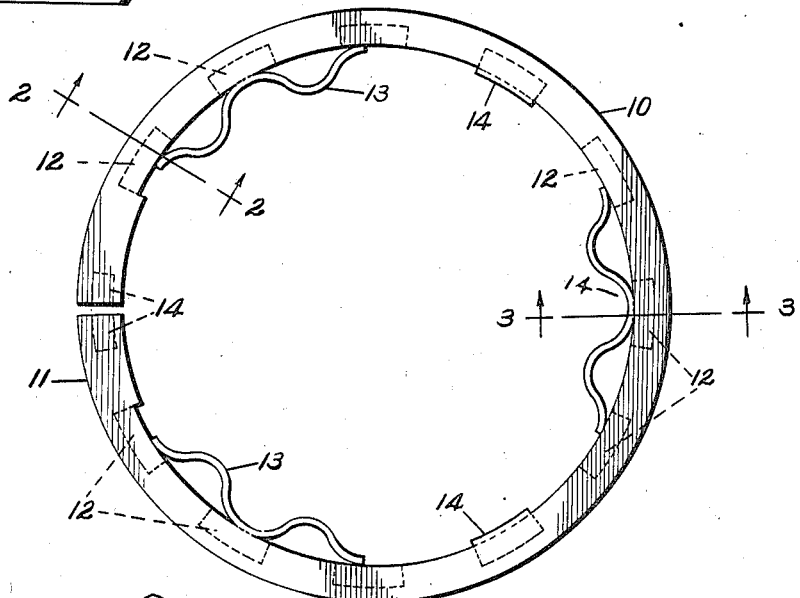
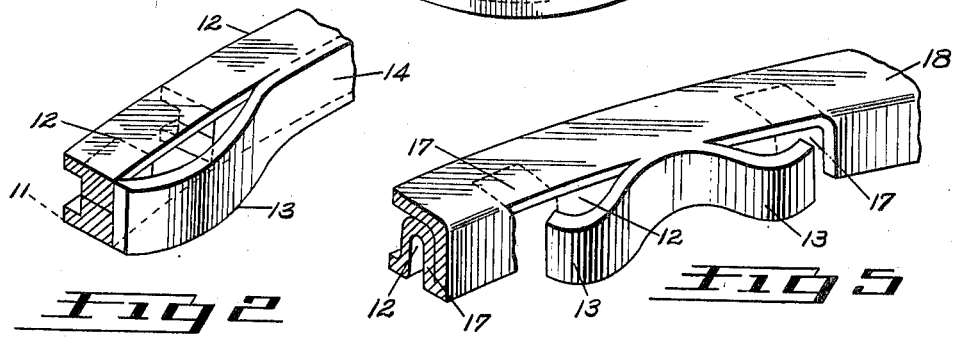
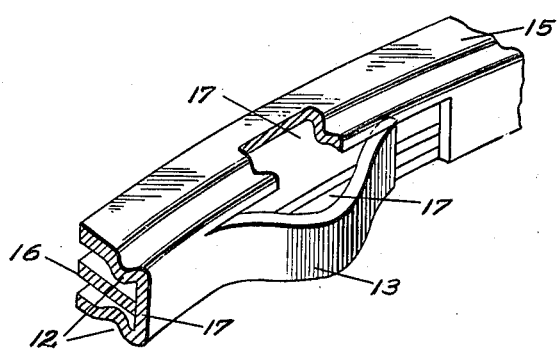
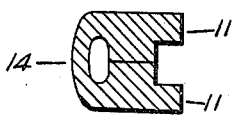
Inventor
William S. Mason Patented Nov. 16, 1943

2,334,273

UNITED STATES PATENT OFFICE 2,334,273

PISTON RING

William S. Mason, Millington, Tenn.

Application October 9, 1942, Serial No. 461,407

2 Claims. (Cl. 309—45)

This invention relates to piston rings, and is a continuation in part of my pending application, Serial Number 422,193, filed December 9, 1941.

One object of my invention is to provide an improved oil control ring having oil scraping and receiving means, and an unusually wide oil drainage space between its upper and lower sides so as to provide free drainage for excess oil scraped off of the wall of the cylinder.

Another object of the present invention is to provide a piston ring having integral radially expansible resilient means for urging its periphery against the wall of the cylinder.

Additional objects and advantages will be brought out in the following description and claims wherein they will be more readily apparent when read in conjunction with the accompanying drawing, in which:

Figure 1 is a top view of a piston ring constructed according to the present invention;

Figure 2 is a fragmentary perspective view along the line 2—2 and Figure 3 is a sectional view on the line 3—3 of Figure 1, looking in the direction of the arrows; and Figures 4 and 5 are fragmentary perspective views of modifications.

The piston ring 10, shown in Figure 1 of the drawing comprises an annular band of resilient metal doubled upon itself longitudinally forming the upper and lower sides of the ring and its edges forming the outer periphery 11, and its medial portion forming the inner periphery and spacing said sides apart axially. Each of the sides is provided with lugs 12, formed and arranged to support the sides outwardly of the inner periphery of the ring to prevent them from being whipped away from the side walls of the piston ring groove and permitting fluid leakage therebetween. The lugs also prevent flexing of the sides at their inner edges so they can be made relatively thin so as to provide the maximum of oil drainage space between their adjacent sides; reduce weight, and require less radial pressure to effectively seal the cylinder wall. The lugs are also formed and arranged to provide additional bearing surface for the spring fingers 13, both ends of which are seated on lugs and urge the periphery of the ring against the wall of the cylinder when the ring is disposed in the groove of a piston and arranged therein. In order to decrease chances of the springs breaking at their point of connection to the ring they are preferably formed to bear on the inner curved side of the ring and the adjoining lugs a substantial distance so that flexing will take place outwardly of their junction to the ring, as more clearly shown in Figure 2. This figure also shows the additional bearing surface afforded the spring fingers by the lugs. The upper and lower sides of the rings are connected at annularly spaced intervals by partitions, or strips 14, which are slightly curved, as more clearly shown in Figure 3, to permit insertion of a shim so as to adjust the axial height of the ring to that of a worn groove, or an over size groove when the ring is used as a replacement ring.

In Figure 4, ring 16 has been interposed between the lugs of ring 15, to increase its axial height and to provide an additional sealing and scraping surface. In this modification the lugs 12, have been formed by embossing the sides of the ring and providing the bosses with slots at annularly spaced intervals. The slots also provide free oil drainage for excess oil. The ring may be made slightly wider at its outer edges, as shown in the drawing, so as to wedgingly engage the side walls of the ring groove, also so that it can be used in a groove either wedge shaped or rectangular cross section without further modification.

In Figure 5, the lugs 12 have been formed by embossing one side of ring 18, and providing the boss with slots 17. In this modification the lugs are only utilized to provide seats for one end of the spring fingers 13, and to maintain the axially spaced arrangement of the sides.

Several further advantages of the rings shown herein, are: they are relatively light in weight, so comparatively little radial pressure is required to maintain effective sealing and scraping pressure on the wall of the cylinder of a high speed internal combustion engine even when the cylinder is worn or tapered, also they would cause less wear due to reciprocating within the groove than a conventional slotted cast iron oil ring; they provide several sealing and scraping surfaces each relatively free to expand radially to follow cylinder irregularities, but prevented from rotating relative to each other, so no additional means are required to maintain their annularly spaced arrangement.

I claim:

1. For use in a cylinder in combination with a reciprocating piston provided with a piston ring groove, a piston ring comprising an elongated band of resilient metal doubled upon itself longitudinally forming the upper and lower sides of the ring and its edges forming the outer periphery and its medial portion forming the inner periphery and spacing said sides apart axially, said medial portion being provided with radially expansible spring fingers and one at least of the sides being provided with a series of lugs adapted to bear on the adjoining side of the ring and maintain the axially spaced arrangement of the sides outwardly of the inner periphery of the ring and provide seats for said spring fingers.

2. For use in a cylinder in combination with a reciprocating piston provided with a packing ring groove, a packing comprising an elongated band of resilient metal doubled upon itself longitudinally forming the upper and lower sides of the ring and its edges forming the outer periphery and its medial portion forming the inner periphery and spacing said sides apart axially, said inner periphery being provided with spring fingers and at least one of said sides being inclined relative to the axis of the ring and provided with means at annularly spaced intervals formed and arranged to provide seats for said spring fingers and maintain the axially spaced arrangement of the sides outwardly of the inner periphery of said ring.

WILLIAM S. MASON.